(12) United States Patent
Vandergucht et al.

(10) Patent No.: US 9,848,533 B2
(45) Date of Patent: Dec. 26, 2017

(54) HARVESTER HEADER STRIPPER DEVICES

(71) Applicant: CNH Industrial America LLC, New Holland, PA (US)

(72) Inventors: Yvan C. C. Vandergucht, Lo-Reninge (BE); Siegfried Vandergucht, Reninge (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/077,629

(22) Filed: Mar. 22, 2016

(65) Prior Publication Data

US 2016/0278290 A1    Sep. 29, 2016

(30) Foreign Application Priority Data

Mar. 23, 2015  (BE) .................................. 2015/5174

(51) Int. Cl.
| | |
|---|---|
| *A01D 45/02* | (2006.01) |
| *A01D 45/10* | (2006.01) |
| *A01D 41/06* | (2006.01) |
| *A01D 41/12* | (2006.01) |
| *A01D 57/02* | (2006.01) |
| *A01D 57/20* | (2006.01) |
| *A01D 101/00* | (2006.01) |

(52) U.S. Cl.
CPC ........... *A01D 45/021* (2013.01); *A01D 41/06* (2013.01); *A01D 41/1208* (2013.01); *A01D 57/02* (2013.01); *A01D 57/20* (2013.01); *A01D 2101/00* (2013.01)

(58) Field of Classification Search
CPC .. A01D 45/021; A01D 45/023; A01D 45/025; A01D 43/082
USPC .......................................................... 56/105
See application file for complete search history.

(56) References Cited

U.S. PATENT DOCUMENTS

| 2,744,375 | A | | 5/1956 | Kidder | |
|---|---|---|---|---|---|
| 3,101,579 | A | * | 8/1963 | Karlsson | ............... A01D 45/021 56/105 |
| 3,528,233 | A | * | 9/1970 | Phillips | ................ A01D 45/021 56/105 |

(Continued)

FOREIGN PATENT DOCUMENTS

| CN | 201243494 Y | 5/2009 |
|---|---|---|
| JP | 2007089464 A | 4/2007 |

*Primary Examiner* — Arpad Fabian-Kovacs
(74) *Attorney, Agent, or Firm* — Peter K. Zacharias; Patrick M. Sheldrake (57) ABSTRACT

A harvester header including a plurality of stripper devices for separating a corn ear or a seed head from a stalk. Each stripper device comprises a left deck plate, a right deck plate, a stalk puller, and at least two crop conveyors. The stalk puller is adapted to separate the corn ear or seed head from the stalk when the corn ear or seed head engages the left and right deck plates. Each of the crop conveyors of each stripper device is arranged between two adjacent stripper devices. The crop conveyors comprise a movable closed transport surface for conveying the separated corn ears or seed heads by moving the closed transport surface in a direction of conveyance which is parallel to the closed transport surface. The transport surfaces of the crop conveyors are arranged at a level below blocking surfaces of the deck plates adjacent to the crop conveyors.

20 Claims, 5 Drawing Sheets

(56) References Cited

U.S. PATENT DOCUMENTS

| | | | | |
|---|---|---|---|---|
| 3,528,234 A * | 9/1970 | Kowalik | ............... | A01D 45/021 |
| | | | | 56/105 |
| 4,115,983 A * | 9/1978 | Barnes | ................. | A01D 43/082 |
| | | | | 56/111 |
| 4,845,930 A * | 7/1989 | Dow | .................... | A01D 45/021 |
| | | | | 460/38 |
| 5,704,202 A * | 1/1998 | Calmer | ................ | A01D 45/023 |
| | | | | 56/106 |
| 5,826,415 A | 10/1998 | Becker | | |
| 5,878,560 A * | 3/1999 | Johnson | ............... | A01D 45/023 |
| | | | | 56/111 |
| 5,878,561 A * | 3/1999 | Gunn | ................... | A01D 45/023 |
| | | | | 56/119 |
| 7,874,134 B1 * | 1/2011 | Hoffman | .............. | A01D 45/023 |
| | | | | 56/119 |
| 8,196,380 B2 * | 6/2012 | Carboni | ............... | A01D 45/021 |
| | | | | 56/62 |
| 8,196,381 B2 * | 6/2012 | Herman | ................. | A01D 45/22 |
| | | | | 56/207 |
| 8,276,357 B2 * | 10/2012 | Brown | ................ | A01D 45/023 |
| | | | | 56/119 |
| 8,863,487 B2 * | 10/2014 | Calmer | ................ | A01D 45/021 |
| | | | | 56/106 |
| 2014/0237975 A1 * | 8/2014 | Walker | ................ | A01D 45/021 |
| | | | | 56/113 |

* cited by examiner

HARVESTER HEADER STRIPPER DEVICES

CROSS REFERENCE TO RELATED APPLICATION

This application claims priority to Belgium Application BE2015/5174 filed Mar. 23, 2015, which is incorporated herein by reference in its entirety.

FIELD OF THE INVENTION

The invention pertains to a harvester header, in particular to a harvester header for separating a corn ear or a seed head from a stalk.

BACKGROUND OF THE INVENTION

When harvesting corn with the aim of collecting corn kernels using a combine harvester, the corn ears that contain the corn kernels are separated from the stalks on which the corn ears grow. To this end, the combine harvester is provided with a harvester header at the front of the combine harvester. Combine harvesters with similar harvester headers are used for harvesting sun flower kernels from sun flower seed heads.

U.S. Pat. No. 8,224,534 discloses a harvester device which is suitable for use in a corn header of a combine harvester. The header comprises a plurality of such harvester devices. The known harvester device comprises a stalk channel that is delimited by two deck plates that are spaced apart from each other to form the stalk channel between them. The combine harvester drives through the corn field and catches the successive corn stalks of a row of corn plants in the stalk channel. Below the deck plates, a pair of stripper rolls is arranged. The stripper rolls are also spaced apart from each other, with the corn stalk channel extending between them. The stripper rolls engage a corn stalk that is caught in the stalk channel and pull the corn stalk downwards. The stalk channel is wide enough to accommodate the corn stalk, but too narrow for the corn ears to pass through. The corn ears are pulled against the top of the deck plates, and are separated from the corn stalk when the corn stalk is pulled further downwards by the stripper rolls.

On top of each deck plate, a gathering chain device is arranged. The gathering chain device comprises a plurality of paddles that are driven by an endless chain. The paddles engage the separated corn ears and transport them towards the collector device, which usually comprises an auger that extends transverse to the main driving direction of the combine harvester. The collector device collects the harvested corn ears and transports them towards the processing device of the combine harvester, in which the corn kernels are removed from the harvested corn ears.

In the known device, corn kernels are often detached from the corn ears during the process of separating the corn ears from the corn stalks and during transport by the gathering chains to the auger. These kernels cannot be harvested, as they slip through the harvester device and fall to the ground. This has a negative impact on the yield that can be achieved by the combine harvester.

SUMMARY OF THE INVENTION

In accordance with an aspect of the present invention, there is provided a harvester header for separating a corn ear or a seed head from a stalk and subsequently transporting the separated corn ear or seed head. The harvester header comprises a stripper device for separating the corn ear or the seed head from the stalk. The stripper device comprises a left deck plate and a right deck plate. The deck plates have a blocking surface and a stalk guide surface, which deck plates are spaced apart from each other with the stalk guide surface of the left deck plate and the stalk guide surface of the right deck plate facing each other. A stalk channel is present between the stalk guide surfaces of the left and right deck plates, which stalk channel has a width which is selected to prevent the corn ear or seed head, respectively, from passing through the stalk channel. The stripper device further comprises a stalk puller, which is adapted to separate the corn ear or seed head from the stalk when said corn ear or seed head engages the blocking surface of the deck plate by forcing said stalk through the stalk channel in a direction that is at an angle relative to the blocking surfaces of the deck plates. The stripper device further comprises a first crop conveyor and a second crop conveyor. The first crop conveyor is arranged adjacent to the left deck plate of the stripper device, and the second crop conveyor is arranged adjacent to the right deck plate of the stripper device. The crop conveyors are adapted to receive the separated corn ear or seed head from the deck plates. The crop conveyors each comprise a movable closed transport surface that is adapted to receive and support the separated corn ear or seed head and to convey said separated corn ear or seed head by moving the closed transport surface in a direction of conveyance which is parallel to the closed transport surface. The transport surface of the crop conveyors is arranged at a level below the blocking surface of the deck plate adjacent to said crop conveyor.

In the harvester header according to an aspect of the present invention, each stripper device comprises two deck plates, which are a right deck plate and a left deck plate. Each deck plate has a blocking surface and a stalk guide surface. The blocking surface is the surface against which the corn ear or seed head, e.g. a sun flower seed head, is pulled during the separation of the corn ear or seed head, respectively, from the stalk. In practical embodiments, this blocking surface will usually be the top of the deck plate.

The deck plates further comprise a stalk guide surface. A stalk channel is present between the stalk guide surfaces of the left and right deck plates. In practical embodiments, the stalk channels of the header device will be parallel or at least generally parallel to each other. When the harvester header is mounted to and forms part of a combine harvester, the stalk channels preferably extend in the main driving direction of the combine harvester, which main driving direction is straight ahead.

The stalk guide surface is part of or forms the wall of the stalk channel and guides the stalk when the stalk is pulled on by the stalk puller in order to detach the corn ears or seed heads from the stalk. In practical embodiments, the stalk guide surface usually extends in the direction of the thickness of the deck plate.

The right deck plate and left deck plate of the same stripper device are spaced apart from each other with the stalk guide surface of the right deck plate and the stalk guide surface of the left deck plate facing each other.

Optionally, the blocking surface of the right deck plate and the blocking surface of the left deck plate of the same stripper device extend in the same plane. This reduces the risk of tilting of a corn ear or seed head, and therewith the risk that the corn ear or seed head slips into the stalk channel where it is likely to get stuck between the stalk guide surfaces of the left and right deck plate, which usually leads to kernels becoming detached from the corn ear or seed head.

In the harvester header according to an aspect present of the invention, the stalk is pulled through the stalk channel by the stalk puller, preferably in the longitudinal direction of the stalk. The longitudinal direction of the stalk is at an angle relative to the longitudinal direction of the stalk channel. However, the corn ears or seed heads cannot pass through the stalk channel because the stalk channel is too narrow, because the distance between the adjacent left and right deck plates of the same stripper device is selected to prevent corn ears or seed heads, respectively, from passing through the stalk channel in a direction substantially perpendicular to the longitudinal direction of the stalk channel. This means that the corn ear or seed head will be pulled against the blocking surface of one or both deck plates of the same stripper device. The stalk will be pulled further, by which pulling on the stalk the corn ear or seed head is severed from the stalk.

The width of the stalk channel is selected based on the expected diameter of the corn ears to be harvested. For example, the expected diameter of the corn earns or seed heads ranges between a minimum diameter and a maximum diameter, with a certain distribution of the diameters over this range. The width of the stalk channel is then for example selected such that 98% of the corn ears or seed head, respectively, will have a diameter that is larger than the width of the stalk channel. For example, the width of the stalk channel can be about 4 cm to about 8 cm, for example 4.5 cm, 5 cm, 5.5 cm, 6 cm or 6.5 cm when corn ears are processed, or about 5 cm to about 15 cm, for example 7 cm, 8 cm, 10 cm, 12 cm or 14 cm when sun flowers are processed. The width of the stalk channel optionally is variable during operation and/or adjustable.

Each stripper device of the harvester header according to an aspect of the present invention further comprises a stalk puller to effect the pulling of the stalk through the stalk channel. The stalk puller is adapted to force a stalk through the stalk channel in a direction that is substantially parallel to the longitudinal direction of said stalk. For example, the stalk puller comprises a pair of stripper rollers, which are optionally provided with trash grabbers. Optionally, the stalk is pulled through the stalk channel in a substantially vertical direction.

The harvester header according to an aspect of the present invention further comprises at least two crop conveyors, each of which is arranged between two adjacent stripper devices. Each crop conveyor is arranged adjacent to the left deck plate of one stripper device and the right deck plate of the other, adjacent, stripper device. Optionally, a first additional crop conveyor is arranged left of the left most deck plate of the entire harvester header and a second additional crop conveyor is arranged right of the right most deck plate of the entire harvester header.

Each of the crop conveyors comprises a movable closed transport surface that is adapted to receive and support the separated corn ears or seed heads. Each of the crop conveyors is furthermore adapted to convey said separated corn ears or seed heads by moving the closed transport surface in a direction of conveyance which is parallel to the closed transport surface.

The transport surface of each of the crop conveyors is arranged at a level below the blocking surface of the deck plate adjacent to said crop conveyor.

The crop conveyors are adapted to receive the separated corn ears or seed heads from the deck plates. When a corn ear or seed head is separated from the stalk by the stripper unit on the left or by the stripper unit on the right of the crop conveyor, the separated corn ear or seed head falls onto the transport surface of the crop conveyor. The transport surface moves in a direction of conveyance, which is parallel to the transport surface, and thus conveys the separated corn ear or seed head by the movement of the movable transport surface.

As the transport surface is a closed surface, kernels that become detached (e.g. during the separation of the corn ear or seed head from the stalk) and fall onto the transport surface of the crop conveyor are also transported further into the combine harvester along with the corn ears or seed heads, respectively, when the harvester header is mounted to and forms part of a combine harvester. This increases the yield that can be obtained with the combine harvester.

In an exemplary embodiment, at least one crop conveyor comprises a conveyor belt which comprises the transport surface. The transport surface of the conveyor belt is a closed belt surface, so without through going holes in said surface. Optionally, the transport surface of the conveyor belt comprises ridges and/or dimples.

In an exemplary embodiment, the harvester header further comprises a crop guide which extends between the blocking surface of a deck plate and the transport surface of the crop conveyor that is arranged adjacent to said deck plate.

The crop guide guides the corn ears or seed heads that have been separated from the stalk from the blocking surface of a deck plate to the transport surface of a crop conveyor, allowing a smooth transfer from the deck plate to the transport surface of a crop conveyor.

In addition, kernels that have become detached from the corn ear or seed head during the separation of the corn ear or seed head from the stalk can move via, e.g. slide over, the crop guide onto the transport surface of the crop conveyor. This way, detached kernels are not lost, but they continue in the normal processing in the combine harvester, along with the corn ears or seed heads.

In an exemplary embodiment, the crop guide is a closed surface. This way, loose kernels are reliably guided to the transport surface of the crop conveyor and the loss of kernels is reduced.

Alternatively or in addition, the crop guide may be connected to the blocking surface of a deck plate, forming a continuous surface. In this embodiment, there is no gap between the blocking surface of the deck plate and the crop guide. This also contributes to reliably guiding the loose kernels to the transport surface of the crop conveyor and to the reduction of the loss of kernels.

In an exemplary embodiment comprising a crop guide between the blocking surface of a deck plate and the transport surface of an adjacent crop conveyor, the crop guide extends at an angle relative to the blocking surface of the deck plate, which angle is between 20° and 70°, preferably between 30° and 60°.

In an exemplary embodiment, the harvester header further comprises a shield element, which shield element is arranged between a stalk puller and an adjacent crop conveyor. The shield element prevents that corn ears or seed heads, in particular corn ears or seed heads that have already been separated from the stalk, come into contact with the stalk puller. The stalk puller generally comprises moving elements which may damage the corn ears or seed heads, resulting in kernels becoming detached from the corn ears or seed heads, respectively. The shield element reduces the risk that this happens, and therewith also helps to increase the yield.

In an exemplary embodiment, the harvester header comprises both a shield element that is arranged between a stalk puller and an adjacent crop conveyor and a crop guide which extends between the blocking surface of a deck plate and the transport surface of the crop conveyor that is arranged adjacent to said deck plate. In such an embodiment, optionally the shield element comprises the crop guide. For example, the crop guide can be a surface of the shield element.

In an exemplary embodiment, a stalk puller comprises a pair of stripper rolls which are arranged substantially parallel to each other, at a level below the blocking surfaces of the deck plates. Preferably, they are parallel to each other when seen in side view, wherein side view means as seen from the side of the harvester header, perpendicular to the main driving direction of the combine harvester when the harvester head is mounted onto a combine harvester.

In an exemplary variant of this embodiment, the stripper rolls are not entirely parallel when seen from above, looking in downward direction. Optionally, the distance between the two stripper rolls of a pair is larger at the front of the harvester header (i.e. on the side where the stalks enter the stalk channel) than at the back of the harvester header (i.e. opposite to the front side, usually on the side where in a combine harvester comprising a harvester header the collector device is present). This facilitates the catching of the stalks in the stalk channel.

In an exemplary embodiment, the stripper device further comprises a stalk cutter, which severs the stalk of the crop from its roots.

In an exemplary embodiment, the transport surface of a crop conveyor comprises one or more ridges and/or dimples, which preferably extend in a direction perpendicular to the direction of movement of the transport surface relative to the adjacent deck plate. These ridges or the walls of the dimples provide additional support for the separated corn ears or seed head and for the kernels that have been detached from them in the process of separating the corn ears or seed heads from the stalks. The ridges and/or dimples are in particular advantageous when the transport surface of the crop conveyor extends in a plane that is under an angle relative to a horizontal plane.

In an exemplary embodiment, two crop conveyors may be present between two adjacent stripper devices, in particular if the harvester devices are arranged one next to the other. An advantage of this embodiment is that the harvester header comprises multiple harvester devices that are identical to each other. This allows a modular set up of the harvester header. Modules can easily be exchanged for example in case of failure, which allows easy maintenance. In addition, in the production process, harvester devices can be assembled first, and then mounted e.g. in a frame to assemble the header harvester.

In accordance with another aspect of the present invention, there is provided a combine harvester for harvesting corn and/or seed. The combine harvester comprises a header assembly, a processing device, and a storage tank. The header assembly comprises a header in accordance with an exemplary embodiment of the present invention and a collector device which is adapted to collect the separated corn ears or seed heads. The crop conveyors are arranged to transport the separated corn ears or seed heads to the collector device. The collector device has a plurality of receiving areas for receiving harvested corn ears or seed heads from the crop conveyors, and a discharge.

In the combine harvester according to an exemplary embodiment of the present invention, the processing device is arranged downstream of the discharge to receive harvested corn ears or seed heads from the discharge of the collector device. The processing device is adapted to remove the kernels from the separated corn ears or seed heads.

The storage tank is adapted and arranged to receive the kernels from the corn processing device.

In an exemplary embodiment, in the combine harvester according to an exemplary embodiment of the present invention, the crop conveyors each comprise a conveyor belt which comprises the transport surface and said conveyor belt is adapted to move relative to the adjacent deck plate with a belt velocity that is substantially equal to the driving speed of the combine harvester. This allows a smooth harvesting of the crop.

In an exemplary embodiment, the combine harvester further comprises a toothed reel which is adapted to guide crop to be harvested towards and/or into the stalk channels of the harvester header, and the crop conveyors each comprise a conveyor belt which comprises the transport surface. In this embodiment, said conveyor belt is adapted to move relative to the adjacent deck plate with a belt velocity that is substantially equal to the velocity of a tooth of the reel. This allows a smooth harvesting of the crop if the harvesting of said crop benefits from the use of a toothed reel in the combine harvester. Optionally, in this embodiment, the conveyor belt is a flat, non-ridged conveyor belt. However, a flat, non-ridged conveyor belt can also be used in all the other embodiments that are described in relation to the invention.

In an exemplary embodiment, the harvester header further comprises row dividers which are arranged between the stalk channels of the harvester header, and the crop conveyors of the harvester header are arranged behind the row dividers.

In an exemplary embodiment, the transport surface of a crop conveyor extends at an angle relative to the horizontal, and the combine harvester further comprises a non-horizontal abutment surface at or adjacent to the upstream end of the crop conveyor. This prevents that separated corn ears or seed heads, and/or kernels that have become detached form the corn ears or seed heads, respectively, to fall on the ground and become lost. This therefore has an advantageous effect on the yield.

BRIEF DESCRIPTION OF THE DRAWINGS

For the purpose of illustration, there are shown in the drawings certain embodiments of the present invention. In the drawings, like numerals indicate like elements throughout. It should be understood, however, that the invention is not limited to the precise arrangements, dimensions, and instruments shown. In the drawings.

DETAILED DESCRIPTION OF THE INVENTION

Figure 1:
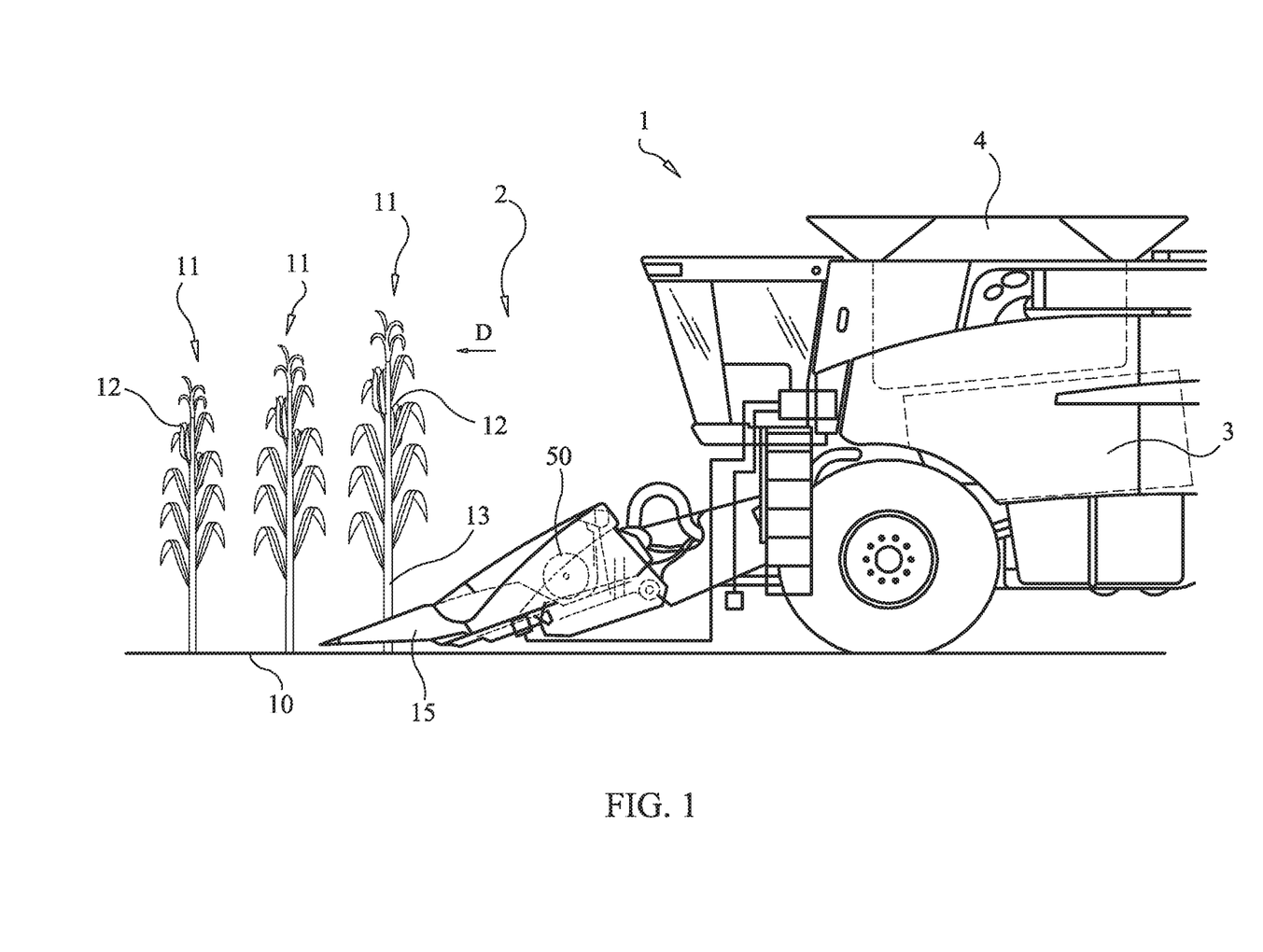
FIG. 1 illustrates a side view of an embodiment of a combine harvester comprising a header, in accordance with an exemplary embodiment of the present invention.

FIG. 1 illustrates a side view of a combine harvester 1 having a harvester header 2, in accordance with an exemplary embodiment of the present invention. This combine harvester 1 is suitable for harvesting corn, in particular for harvesting corn kernels from corn ears.

In use, the combine harvester 1 is driven over a field 10, on which rows of plants 11 are grown. These plants 11 are for example corn plants that comprise corn ears 12 and stalks 13. Alternatively, the plants 11 are for example sun flower plants that each have a stalk and a seed head at the top of the stalk. Also other plants that have seed heads or seed pods and of which the seed is the crop for which the plant is grown can be harvested using the harvester header 2 in accordance with an exemplary embodiment of the present invention. The driving direction D of the combine harvester 1 is substantially parallel to the rows of plants 11.

The combine harvester 1 comprises the harvester header 2, a processing device 3, and a storage tank 4. The header 2 harvests the corn ears 12 or seed heads by separating the corn ears 12 or seed heads from the stalks 13 and transports the harvested corn ears 12 or seed heads to the processing device 3. In the processing device 3, the kernels are removed from the corn ears 12 or seed heads. The kernels are then stored in a storage tank 4, which is emptied periodically or continuously.

Figure 2:
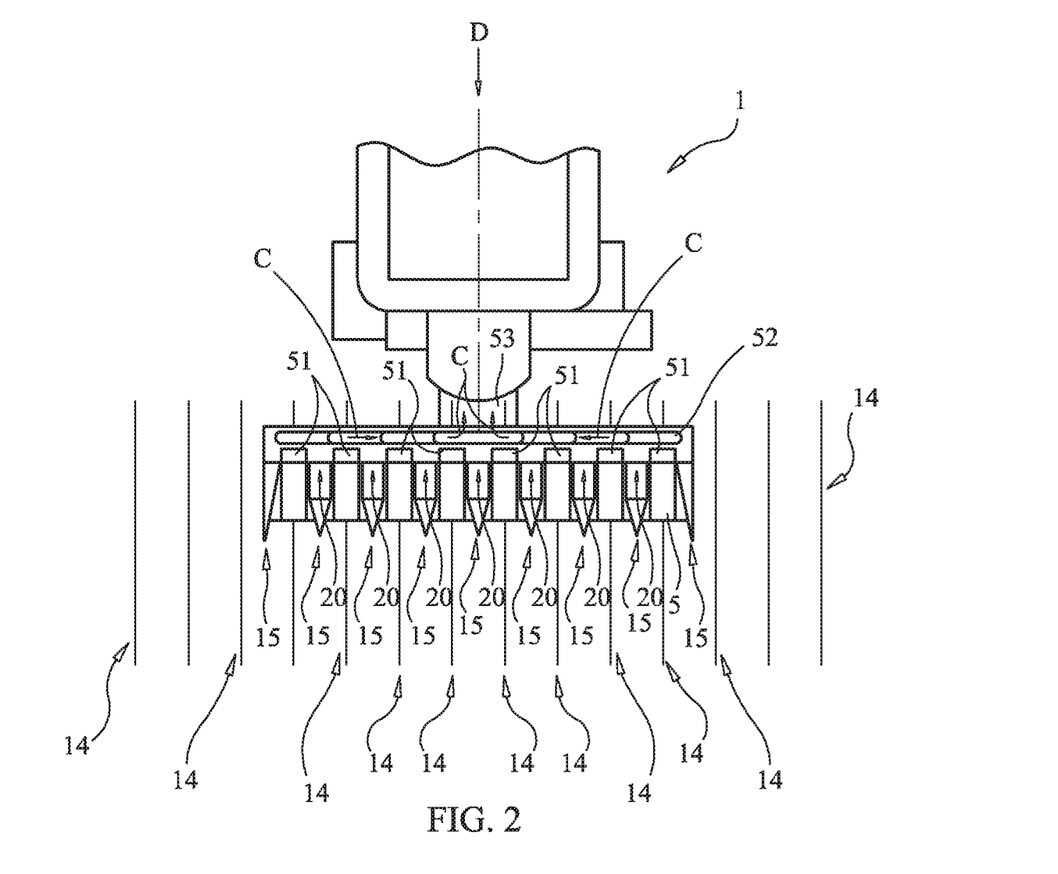
FIG. 2 illustrates a top view of the combine harvester of FIG. 1, in accordance with an exemplary embodiment of the present invention.

FIG. 2 illustrates a top view of the combine harvester 1 of FIG. 1, and particularly of the harvester header 2 thereof, in accordance with an exemplary embodiment of the present invention. The combine harvester 1 drives in the driving direction D through the field, which comprises rows 14 of plants.

The header 2 comprises multiple row dividers 15, which extend between the rows 14 of the plants. Between the row dividers 15, stripper devices 30 (labeled in FIG. 3) and crop conveyors 20 according to an exemplary embodiment of the present invention are present.

The header 2 further comprises a collector device 50 (labeled in FIG. 1), which may be a header conveyor in the form of an auger. As can be seen in FIG. 2, the collector device 50 is arranged downstream of the crop conveyors 20 when seen in the direction of the movement of the corn ears 12 or seed heads through the combine harvester 1, which is indicated by the arrows C in FIG. 2.

The collector device 50 has a plurality of receiving areas 51 for receiving harvested corn ears 12 or seed heads from the crop conveyors 20. The collector device 50 further comprises a discharge 53. The collector device 50 optionally comprises an auger 52 for transporting the harvested corn ears 12 or seed heads from the plurality of receiving areas 51 to the discharge 53.

Figure 3:
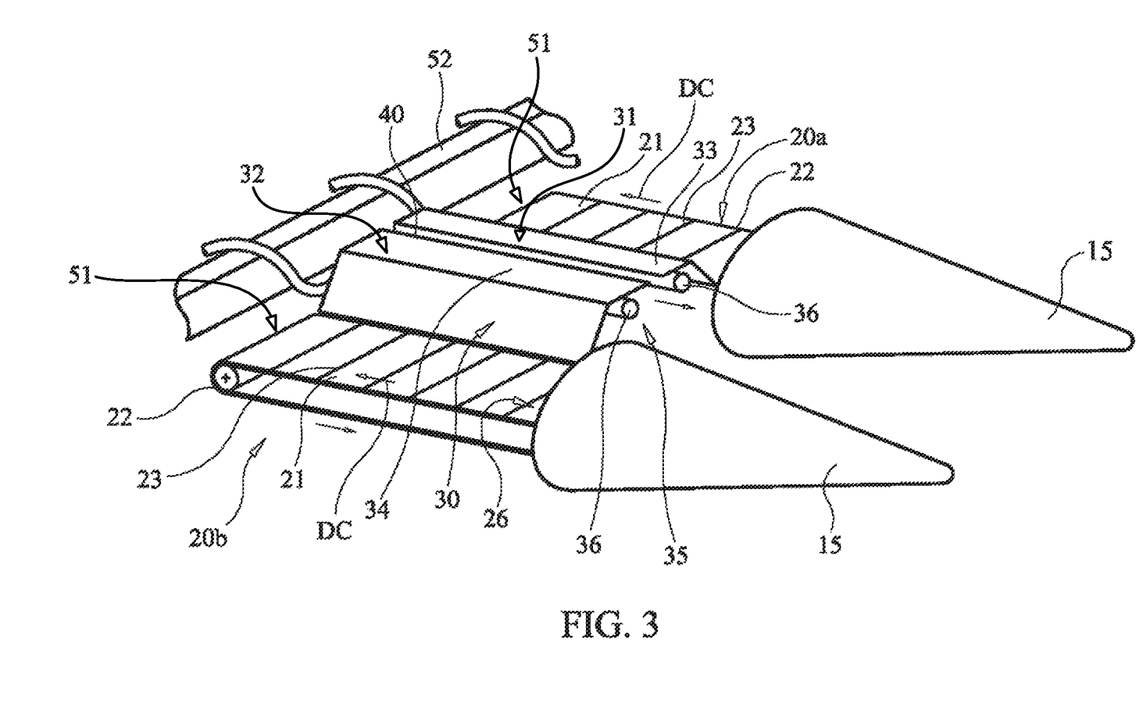
FIG. 3 illustrates a part of the harvester header of FIG. 2, in accordance with an exemplary embodiment of the present invention.

FIG. 3 shows a part of the embodiment of the harvester header 1, in accordance with an exemplary embodiment of the present invention. FIG. 3 shows an exemplary embodiment of the stripper device 30, having a left deck plate 31 and a right deck plate 32 and a stalk puller 35, which comprises two stripper rolls 36.

Figure 4:
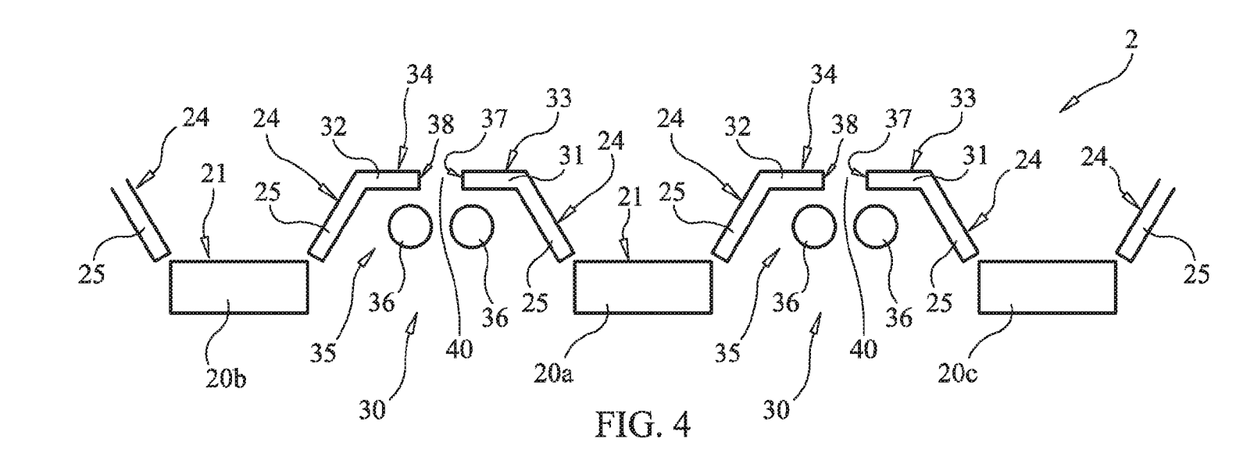
FIG. 4 schematically illustrates a front view of a part of the harvester header of FIG. 2, in accordance with an exemplary embodiment of the present invention.

The deck plates 31, 32 each have a respective blocking surface 33, 34 and a respective stalk guide surface 37, 38 (also illustrated in FIG. 4). The deck plates 31, 32 are spaced apart from each other with the stalk guide surface 37 of the left deck plate 31 and the stalk guide surface 38 of the right deck plate 32 facing each other.

A stalk channel 40 is present between the stalk guide surfaces 37, 38 of the left and right deck plates 31, 32. The stalk channel 40 has a width which is selected to prevent corn ears 12 or seed heads, respectively, from passing through the stalk channel 40. Optionally, the width of the stalk channel 40 is adjustable or variable.

The stalk puller 35 is adapted to separate a corn ear 12 or seed head from a stalk when said corn ear 12 or seed head engages a blocking surface 33, 34 of a deck plate 31, 32 by forcing said stalk 13 through the stalk channel 40 in a direction that is at an angle relative to the blocking surfaces 33, 34 of the deck plates 31, 32. In the embodiment shown in FIG. 3, the stripper rolls 36 are arranged at a level below the blocking surfaces 33, 34 of the deck plates 31, 32.

Furthermore, FIG. 3 shows two crop conveyors 20a, 20b. One crop conveyor 20a is arranged adjacent to left deck plate 31 and another crop conveyor 20b is arranged adjacent to the right deck plate 32.

The harvester header 2 according to an exemplary embodiment of the present invention comprises multiple stripper devices. One of these multiple stripper devices is arranged adjacent to the crop conveyor 20a on the side opposite to where stripper device 30 is arranged, and another one of these multiple stripper devices is arranged adjacent to crop conveyor 20b on the side opposite to where stripper device 30 is arranged. Both crop conveyors 20a, 20b are thus arranged between two adjacent stripper devices, adjacent to the left deck plate of one stripper device and the right deck plate of the other, adjacent, stripper device.

The crop conveyors 20a, 20b are adapted to receive the separated corn ears 23 or seed heads from the deck plates 31, 32. When the stalk puller 35 pulls the stalk 13 through the stalk channel 40, e.g. in a downward direction, the corn ear 12 or seed head cannot pass through the stalk channel 40 and remains above the blocking surfaces 33, 34. Once the corn ear 12 or seed head is separated, e.g. pulled free, from the stalk 13, the separated corn ear 12 or seed head falls from the blocking surfaces 33, 34 onto one of the crop conveyors 20a, 20b.

Each of the crop conveyors 20a, 20b comprises a movable closed transport surface 21 that is adapted to receive and support the separated corn ears 12 or seed heads and to convey said separated corn ears 12 or seed heads by moving the closed transport surface 12 in a direction of conveyance DC which is parallel to the closed transport surface 21. As can be seen in FIG. 3, the transport surface 21 of each of the crop conveyors 20a, 20b is arranged at a level below the blocking surfaces 33, 34 of the deck plates 31, 32 adjacent to the respective crop conveyor 20a, 20b.

In the embodiment of FIG. 3, the crop conveyors 20a, 20b are belt conveyors each comprising a belt 22. The belt 22 of each crop conveyor 20a, 20b comprises the transport surface 21. In the embodiment of FIG. 3, the belts 22 of the crop conveyors 20a, 20b and therewith the transport surface 21 of these crop conveyors 20a, 20b comprise ridges 23, which extend in a direction perpendicular to the direction DC of movement of the transport surface 21 relative to the adjacent deck plate 31, 32. Instead of or in addition to these ridges 23, dimples may be present.

The crop conveyors 20a, 20b transport the separated corn ears 12 or seed heads, including kernels that have become detached from the corn ears 12 or seed heads, respectively, towards the receiving areas 51 of the collector device 50.

The collector device 50 furthermore comprises an auger 52, which receives the corn ears 12 or seed heads, including kernels that have become detached from the corn ears 12 or seed heads at the receiving areas 21 and transports them to the discharge of the collector device 50.

Optionally, when the harvester header 2 is mounted on the combine harvester 1 and in use, the conveyor belts 22 are adapted to move relative to the adjacent deck plate 31, 32 with a belt velocity that is substantially equal to the driving speed of the combine harvester 1.

In the embodiment of FIG. 3, the harvester header 2 further comprises row dividers 15 which are arranged between the stalk channels 40 of the harvester header 2. The crop conveyors 20a, 20b are arranged behind the row dividers 15, as seen in the main driving direction D of the combine harvester 1 and of the flow of crop through the harvester header 2.

In the embodiment of FIG. 3, optionally the combine harvester 1 holds the transport surface 21 of the crop conveyors 20a, 20b at an angle relative to the horizontal. Optionally, the combine harvester 1 further comprises a non-horizontal abutment surface 26 at or adjacent to the upstream end of the crop conveyor 20a, 20b. This abutment surface 26 is in this embodiment, for example, formed by the rear surface of the row dividers 15.

FIG. 4 schematically illustrates a front view of a part of a possible embodiment of a harvester head 2, in accordance with an exemplary embodiment of the present the invention. FIG. 4 shows two stripper devices 30, each having a left deck plate 31 and a right deck plate 32 and a stalk puller 35, which stalk puller 35 comprises two stripper rolls 36.

The indications "left" and "right" are as seen from the driver's cabin of the combine harvester 1, with the harvester header 2 mounted to the front of the combine harvester 1. As FIG. 4 shows a front view, which thus is viewed from the opposite direction as from the driver's cabin, the left deck plate 31 is shown to the right of the right deck plate 32 in FIG. 4.

Each deck plate 31, 32 has a respective blocking surface 33, 34 and a stalk guide surface 37, 38. The deck plates 31, 32 are spaced apart from each other with the stalk guide surface 37 of the left deck plate 31 and the stalk guide surface 38 of the right deck plate 32 facing each other.

A stalk channel 40 is present between the stalk guide surfaces 37, 38 of the left and right deck plates 31, 32. The stalk channel 40 has a width which is selected to prevent corn ears 12 or seed heads, respectively, from passing through the stalk channel 40.

The stalk puller 35 is adapted to separate a corn ear 12 or seed head from a stalk 13 when said corn ear 12 or seed head engages a blocking surface 33, 34 of a deck plate 31, 32 by forcing said stalk 13 through the stalk channel 40 in a direction that is at an angle relative to the blocking surfaces 33, 34 of the deck plates 31, 32. In the embodiment shown in FIG. 4, the stripper rolls 36 are arranged at a level below the blocking surfaces 33, 34 of the deck plates 31, 32.

Furthermore, FIG. 4 shows three crop conveyors 20a, 20b, 20c. These crop conveyors 20a, 20b, 20c are arranged between adjacent stripper devices 30. The crop conveyors 20a, 20b, 20c are adapted to receive the separated corn ears 12 or seed heads from the deck plates 31, 32. When the stalk puller 35 pulls the stalk 13 through the stalk channel 40, e.g. in a downward direction, the corn ear 12 or seed head cannot pass through the stalk channel 40 and remains above the blocking surfaces 33, 34. Once the corn ear 12 or seed head is separated, e.g. pulled free, from the stalk 13, the separated corn ear 12 or seed head falls from the blocking surfaces 33, 34 onto one of the crop conveyors 20a, 20b, 20c.

Each of the crop conveyors 20a, 20b, 20c comprises a movable closed transport surface 21 that is adapted to receive and support the separated corn ears 12 or seed heads and to convey said separated corn ears 12 or seed heads by moving the closed transport surface 21 in a direction of conveyance which is parallel to the closed transport surface 21. As can be seen in FIG. 4, the transport surface 21 of each of the crop conveyors 20a, 20b, 20c is arranged at a level below the blocking surfaces 33, 34 of the deck plates 31, 32 adjacent to the respective crop conveyor 20a, 20b, 20c. The crop conveyors 20a, 20b, 20c are for example belt conveyors, having either a flat belt or a belt with ridges and/or dimples.

In the embodiment of FIG. 4, the harvester header 2 further comprises a crop guide 24 which extends between the blocking surface 33, 34 of the deck plate 31, 32 and the transport surface 21 of the crop conveyor 20a, 20b, 20c that is arranged adjacent to said deck plate 31, 32. This crop guide 24 guides a separated corn ear 12 or seed head, or kernels that have become detached from the corn ear 12 or seed head during the separation of the corn ear 12 or seed head from the stalk 13 from the blocking surface 33, 34 of the deck plate 31, 32 to the transport surface 21 of a crop conveyor 20a, 20b, 20c that is arranged adjacent to the respective blocking surface 33, 34 of the deck plate 31, 32. In the embodiment of FIG. 4, the crop guide 24 has a closed surface, with prevents kernels which have become detached from the corn ears 12 or seed heads from falling onto the ground.

In the embodiment of FIG. 4, the crop guide 24 extends at an angle relative to the blocking surface 33, 34 of the adjacent deck plate 31, 32, which angle is between 20° and 70°. Optionally, this angle is between 30° and 60°. In the embodiment of FIG. 4, the crop guide 24 is connected to the blocking surface 33, 34 of the adjacent deck plate 31, 32, therewith forming a continuous surface. This also prevents the kernels which have become detached from the corn ears 12 or seed heads from falling onto the ground.

In this embodiment, the crop guide 24 is connected to the blocking surface 33, 34 of a deck plate 31, 32, forming a continuous surface. In this embodiment, there is no gap between the blocking surface 33, 34 of the deck plate 31, 32 and the crop guide 24. This contributes to reliably guiding the loose kernels to the transport surface 21 of the crop conveyor 20a, 20b, 20c and to the reduction of the loss of kernels.

In the embodiment of FIG. 4, the harvester header 2 further comprises a shield element 25. The shield element 25 is arranged between a stalk puller 35 and an adjacent crop conveyor 20a, 20b, 20c. In the embodiment shown, the shield element 25 comprises the crop guide 24. The crop guide 24 in this example is a part of the surface of the shield element 25.

In the embodiment of FIG. 4, the deck plate 31, 32, the shield element 25, and the crop guide 24 can be integrated into a single structural part that can, for example, be manufactured from a bent plate or by welding two plates to each other at the desired angle.

Figure 5:
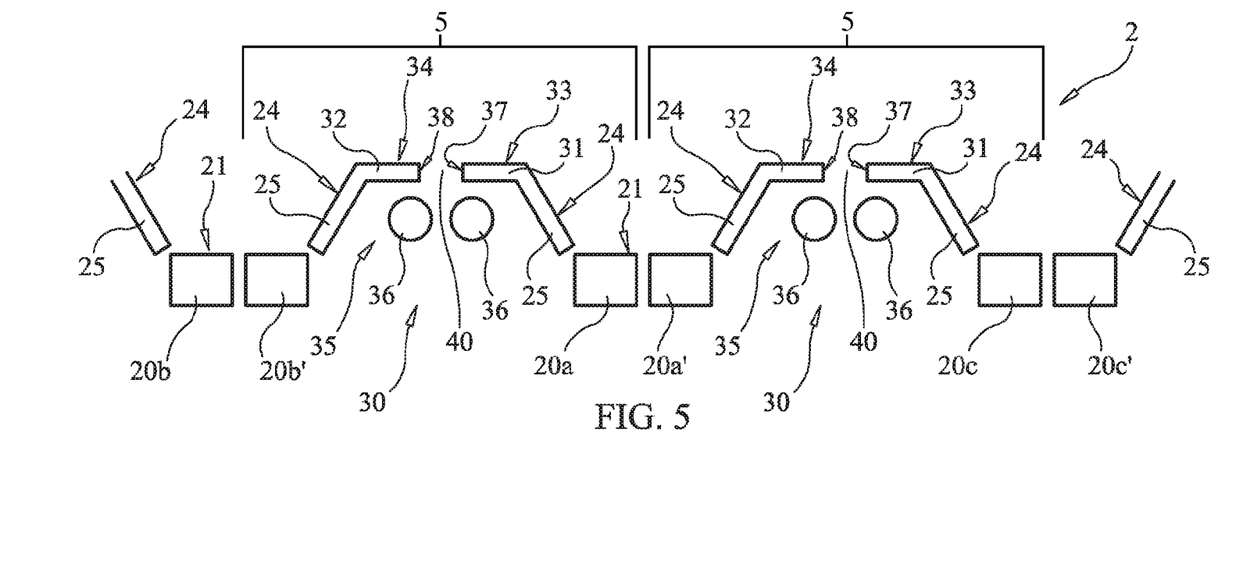
FIG. 5 illustrates a front view of a part of a special embodiment of the harvester header of FIG. 2, in accordance with an exemplary embodiment of the present invention.

FIG. 5 shows a front view of a part of another embodiment of the harvester header 2, in accordance with an exemplary embodiment of the present invention. In the embodiment of FIG. 5, the harvester header 2 is of a modular design. The harvester header 2 of FIG. 5 comprises multiple harvester devices 5 which are arranged adjacent to each other.

Each harvester device 5 comprises a stripper device 30 and two crop conveyors 20b' and 20a or 20a' and 20c. In this embodiment, two crop conveyors 20a, 20a'; 20b, 20b'; 20c, 20c' are present between adjacent stripper devices 30.

The stripper devices 30 and crop conveyors 20a, 20a'; 20b, 20b'; 20c, 20c' are the same or substantially the same as in the embodiments in which there is just one crop conveyor 20a, 20b, 20c present between adjacent stripper devices 30. However, in general, the individual crop conveyors 20a, 20a'; 20b, 20b'; 20c, 20c' will be narrower in the embodiment with the harvester devices 5 than in the embodiment with a single crop conveyor 20a, 20b, 20c between the stripper devices 30. In the embodiment illustrated in FIG. 5, each of the stripper devices 30 has a left deck plate 31 and a right deck plate 32 and a stalk puller 35, which stalk puller 35 comprises two stripper rolls 36.

The indications "left" and "right" are as seen from the driver's cabin of the combine harvester 1, with the harvester header 2 mounted to the front of the combine harvester 1. As FIG. 5 shows a front view, which thus is viewed from the opposite direction as from the driver's cabin, the left deck plate 31 is shown to the right of the right deck plate 32 in FIG. 5.

Each deck plate 31, 32 has a blocking surface 33, 34 and a stalk guide surface 37, 38. The deck plates 31, 32 are spaced apart from each other with the stalk guide surface 37 of the left deck plate 31 and the stalk guide surface 38 of the right deck plate 32 facing each other A stalk channel 40 is present between the stalk guide surfaces 37, 38 of the left and right deck plates 31, 32. The stalk channel 40 has a width which is selected to prevent corn ears 12 or seed heads, respectively, from passing through the stalk channel 40.

The stalk puller 35 is adapted to separate a corn ear 12 or seed head from a stalk 13 when said corn ear 12 or seed head engages a blocking surface 33, 34 of a deck plate 31, 32 by forcing said stalk 13 through the stalk channel 40 in a direction that is at an angle relative to the blocking surfaces 33, 34 of the deck plates 31, 32. In the embodiment shown in FIG. 5 the stripper rolls 36 are arranged at a level below the blocking surfaces 33, 34 of the deck plates 31, 32.

Furthermore, FIG. 5 shows three pairs of crop conveyors 20a, 20a'; 20b, 20b'; 20c, 20c'. These pairs of crop conveyors 20a, 20a'; 20b, 20b'; 20c, 20c' are arranged between adjacent stripper devices 30. The crop conveyors 20a, 20a'; 20b, 20b'; 20c, 20c' are adapted to receive the separated corn ears 12 or seed heads from the deck plates 31, 32. When the stalk puller 35 pulls the stalk 13 through the stalk channel 40 of one of the stripper devices 30, e.g. in downward direction, the corn ear 12 or seed head cannot pass through the stalk channel 40 and remains above the blocking surfaces 33, 34. Once the corn ear 12 or seed head is separated, e.g. pulled free, from the stalk 13, the separated corn ear 12 or seed head falls from the blocking surfaces 33, 34 onto one of the crop conveyors 20a, 20a'; 20b, 20b'; 20c, 20c'.

Each of the crop conveyors 20a, 20a'; 20b, 20b'; 20c, 20c' comprises a movable closed transport surface 21 that is adapted to receive and support the separated corn ears 12 or seed heads and to convey said separated corn ears 12 or seed heads by moving the closed transport surface 21 in a direction of conveyance which is parallel to the closed transport surface 21. As can be seen in FIG. 5, the transport surface 21 of each of the crop conveyors 20a, 20a'; 20b, 20b'; 20c, 20c' is arranged at a level below the blocking surfaces 33, 34 of the deck plates 31, 32 adjacent to the respective crop conveyor 20a, 20a'; 20b, 20b'; 20c, 20c'. The crop conveyors 20a, 20a'; 20b, 20b'; 20c, 20c' are, for example, belt conveyors, having either a flat belt or a belt with ridges and/or dimples.

In the embodiment of FIG. 5, the harvester header 2 further comprises a crop guide 24 which extends between the blocking surface 33, 34 of the deck plate 31, 32 and the transport surface 21 of the crop conveyor 20a, 20a'; 20b, 20b'; 20c, 20c' that is arranged adjacent to said deck plate 31, 32. This crop guide 24 guides a separated corn ear 12 or seed head, or kernels that have become detached from the corn ear 12 or seed head during the separation of the corn ear 12 or seed head from the stalk 13 from the blocking surface 33, 34 of the deck plate 31, 32 to the transport surface 21 of a crop conveyor 20a, 20a'; 20b, 20b'; 20c, 20c' that is arranged adjacent to the respective blocking surface 33, 34 of the deck plate 31, 32. In the embodiment of FIG. 5, the crop guide 24 has a closed surface, with prevents that kernels which have become detached from the corn ears 12 or seed heads fall onto the ground.

In the embodiment of FIG. 5 the crop guide 24 extends at an angle relative to the blocking surface 33, 34 of the adjacent deck plate 31, 32, which angle is between 20° and 70°. Optionally, this angle is between 30° and 60°. In the embodiment of FIG. 5, the crop guide 24 is connected to the blocking surface 33, 34 of the adjacent deck plate 31, 32, therewith forming a continuous surface. This also prevents that kernels which have become detached from the corn ears 12 or seed heads fall onto the ground.

In this embodiment, the crop guide 24 is connected to the blocking surface 33, 34 of a deck plate 31, 32, forming a continuous surface. In this embodiment, there is no gap between the blocking surface 33, 34 of the deck plate 31, 32 and the crop guide 24. This contributes to reliably guiding the loose kernels to the transport surface 21 of the crop conveyor 20a, 20a'; 20b, 20b'; 20c, 20c' and to the reduction of the loss of kernels.

In the embodiment of FIG. 5, the harvester header 2 further comprises a shield element 25. The shield element 25 is arranged between a stalk puller 35 and an adjacent crop conveyor 20a, 20a'; 20b, 20b'; 20c, 20c'. In the embodiment shown, the shield element 25 comprises the crop guide 24. The crop guide 24 in this example is a part of the surface of the shield element 25.

In the embodiment of FIG. 5, the deck plate 31, 32, the shield element 25, and the crop guide 24 can be integrated into a single structural part that can, for example, be manufactured from a bent plate or by welding two plates to each other at the desired angle.

Figure 6:
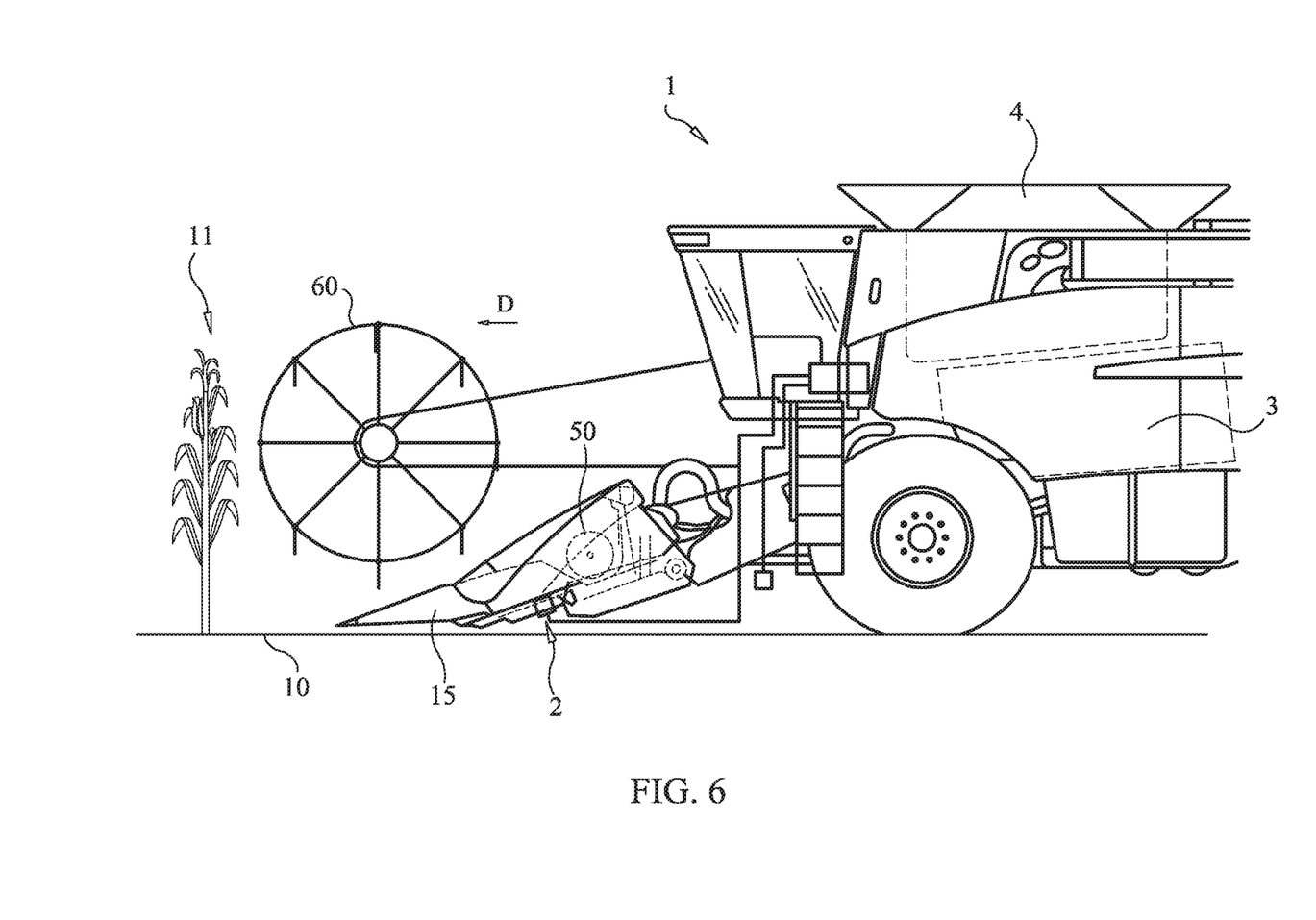
FIG. 6 illustrates an example of a combine harvester in which a harvester header according to an exemplary embodiment of the present invention can be used, in accordance with an exemplary embodiment of the present invention.

FIG. 6 illustrates an example of a combine harvester 1 in which a harvester header 2 according to an embodiment of the present invention can be used. In this example, the combine harvester 1 comprises a harvester header 2, a collector device 50 optionally comprising an auger, a processing device 3, and a storage tank 4. In respect of these elements, the combine harvester of FIG. 6 is the same as the combine harvester of FIG. 1. It is to be understood that the harvester header 2 of FIG. 6 can be any embodiment of the harvester header 2 according to exemplary embodiments of the present invention.

In the example of FIG. 6, the combine harvester 1 however further comprises a toothed reel 60 which is adapted to guide crop to be harvested towards and/or into the stalk channels 40 of the harvester header 2. Toothed reels of this type are known in the art. Advantageously, in this type of combiner harvester 1, the crop conveyors 20a, 20b, 20c or 20a, 20a'; 20b, 20b'; 20c, 20c' each comprise a conveyor belt which comprises the transport surface 21, and these conveyor belts are adapted to move relative to the adjacent deck plate 31, 32 with a belt velocity that is substantially equal to the velocity of a tooth of the reel 60. Optionally, in this example the conveyor belt is a flat, non-ridged conveyor belt.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A harvester header for separating a corn ear or a seed head from a stalk and subsequently transporting the separated corn ear or seed head, the harvester header comprising:
    a plurality of harvester devices, each of the plurality of harvester devices comprising:
        a stripper device for separating the corn ear or the seed head from the stalk, the stripper device comprising:
            a left deck plate; and
            a right deck plate,
            wherein each of the left and right deck plates has a blocking surface and a stalk guide surface,
            wherein the left and right deck plates are spaced apart from each other with the stalk guide surface of the left deck plate and the stalk guide surface of the right deck plate facing each other,
            wherein a stalk channel is present between the stalk guide surfaces of the left and right deck plates, which stalk channel has a width which is selected to prevent the corn ear or seed head, respectively, from passing through the stalk channel,
            a stalk puller positioned to separate the corn ear or seed head from the stalk when the corn ear or seed head engages the blocking surface of the left or right deck plate by forcing the stalk through the stalk channel in a direction that is at an angle relative to the blocking surfaces of the left and right deck plates;
        a first crop conveyor arranged adjacent to the left deck plate of the stripper device, the first crop conveyor comprising a first moveable closed transport surface positioned to receive a first separated corn ear or seed head from the deck plates and to convey the first separated corn ear or seed head in a first direction of conveyance which is parallel to the first moveable closed transport surface; and
        a second crop conveyor positioned adjacent to the right deck plate of the stripper device, the second crop conveyor comprising a second moveable closed transport surface positioned to receive a second separated corn ear or seed head from the deck plates and to convey the second separated corn ear or seed head in a second direction of conveyance which is parallel to the second moveable closed transport surface,
        wherein the first and second transport surfaces are positioned at a level below the blocking surfaces of the left and right deck plates adjacent to the first and second crop conveyors; and
    a collector device.

2. The harvester header of claim 1, wherein the stripper device of each of the plurality of harvester devices further comprises a first crop guide which extends between the blocking surface of the left deck plate and the first moveable closed transport surface of the first crop conveyor, and a second crop guide which extends between the blocking surface of the right deck plate and the second moveable closed transport surface of the second crop conveyor.

3. The harvester header of claim 2, wherein the first crop guide of the stripper device of each of the plurality of harvester devices extends at a first angle relative to the blocking surface of the left deck plate, and the second crop guide of the stripper device of each of the plurality of harvester devices extends at a second angle relative to the blocking surface of the right deck plate, wherein the first and second angles are between 20° and 70°.

4. The harvester header of claim 2, wherein the stripper device of each of the plurality of harvester devices further comprises at least one shield element arranged between the stalk puller and the first or second crop conveyor, wherein the at least one shield element comprises the first or second crop guide.

5. The harvester header of claim 2, wherein the first crop guide of the stripper device of each of the plurality of harvester devices is connected to the blocking surface of the left deck plate of the stripper device of each of the plurality of harvester devices, thereby forming a continuous surface, and the second crop guide of the stripper device of each of the plurality of harvester devices is connected to the blocking surface of the right deck plate of the stripper device of each of the plurality of harvester devices, thereby forming another continuous surface.

6. The harvester header of claim 1, wherein the stripper device of each of the plurality of harvester devices further comprises at least one shield element arranged between the stalk puller and the first or second crop conveyor.

7. The harvester header of claim 1, wherein the stalk puller of the stripper device of each of the plurality of harvester devices further comprises a pair of stripper rolls which are arranged substantially parallel to each other, at a level below the blocking surfaces of the left and right deck plates of the stripper device of each of the plurality of harvester devices.

8. The harvester header of claim 1, wherein the transport surfaces of the first and second crop conveyors of the stripper device of each of the plurality of harvester devices comprises one or more ridges or dimples, which preferably extend in a direction perpendicular to the first and second direction.

9. The harvester header of claim 1, wherein the first crop conveyor of each of the plurality of harvester devices comprises a first conveyor belt which comprises the first moveable closed transport surface, and the second crop conveyor of each of the plurality of harvester devices comprises a second conveyor belt which comprises the second moveable closed transport surface.

10. A combine harvester for harvesting corn or seed, the combine harvester comprising:
    a header assembly comprising a header according to claim 1,
        wherein the collector device is positioned to collect the separated corn ear or seed head;
        wherein the first and second crop conveyors of each of the plurality of harvester devices are positioned to transport the first and second separated corn ears or seed heads to the collector device, and
        wherein the collector device has a plurality of receiving areas for receiving the first and second separated corn ears or seed heads from the first and second crop conveyors of each of the plurality of harvester devices, and a discharge, a processing device, which is positioned downstream of the discharge to receive the first and second separated corn ears or seed heads from the discharge of the collector device, which processing device removes the kernels from the first and second separated corn ears or seed heads; and a storage tank, positioned to receive the kernels from the corn processing device.

11. The combine harvester of claim 10, wherein the first crop conveyor of each of the plurality of harvester devices comprises a first conveyor belt which comprises the first moveable closed transport surface, and the second crop conveyor of each of the plurality of harvester devices comprises a second conveyor belt which comprises the second moveable closed transport surface, wherein the conveyor belts are adapted to move relative to an adjacent deck plate with a belt velocity that is substantially equal to a driving speed of the combine harvester.

12. The combine harvester of claim 10, further comprising a toothed reel which is adapted to guide crop to be harvested towards or into the stalk channel of the stripper device of each of the plurality of harvester devices of the header, wherein the first crop conveyor of each of the plurality of harvester devices comprises a first conveyor belt which comprises the first moveable closed transport surface, and the second crop conveyor of each of the plurality of harvester devices comprises a second conveyor belt which comprises the second moveable closed transport surface, wherein the conveyor belts are adapted to move relative to an adjacent deck plate with a belt velocity that is substantially equal to a velocity of a tooth of the reel.

13. The combine harvester of claim 12, wherein the first conveyor belt of the first crop conveyor each of the plurality of harvester devices is a flat, non-ridged conveyor belt, and the second conveyor belt of the second crop conveyor each of the plurality of harvester devices is a flat, non-ridged conveyor belt.

14. The combine harvester of claim 10, wherein the header further comprises row dividers which are arranged between the stalk channel of the stripper device each of the plurality of harvester devices, and wherein the first and second crop conveyors of each the plurality of harvester devices are arranged behind the row dividers.

15. The combine harvester of claim 10, wherein the transport surface of the first or second crop conveyor of each of the plurality of harvester devices extends at an angle relative to horizontal, and wherein the combine harvester further comprises a non-horizontal abutment surface at or adjacent to an upstream end of the first or second crop conveyor of each of the plurality of harvester devices.

16. A harvester header for separating a corn ear or a seed head from a stalk and subsequently transporting the separated corn ear or seed head, the harvester header comprising:

at least one harvester device comprising:
a stripper device for separating the corn ear or the seed head from the stalk, the stripper device comprising:
a left deck plate; and
a right deck plate,
wherein each of the left and right deck plates has a blocking surface and a stalk guide surface,
wherein the left and right deck plates are spaced apart from each other with the stalk guide surface of the left deck plate and the stalk guide surface of the right deck plate facing each other,
wherein a stalk channel is present between the stalk guide surfaces of the left and right deck plates, which stalk channel has a width which is selected to prevent the corn ear or seed head, respectively, from passing through the stalk channel,
a stalk puller positioned to separate the corn ear or seed head from the stalk when the corn ear or seed head engages the blocking surface of the left or right deck plate by forcing the stalk through the stalk channel in a direction that is at an angle relative to the blocking surfaces of the left and right deck plates;
a first crop conveyor positioned adjacent to the left deck plate of the stripper device, the first crop conveyor comprising a first moveable closed transport surface configured to receive a first separated corn ear or seed head from the deck plates and to convey the first separated corn ear or seed head in a first direction of conveyance which is parallel to the first moveable closed transport surface; and
a second crop conveyor positioned adjacent to the right deck plate of the stripper device, the second crop conveyor comprising a second moveable closed transport surface configured to receive a second separated corn ear or seed head from the deck plates and to convey the second separated corn ear or seed head in a second direction of conveyance which is parallel to the second moveable closed transport surface,
wherein the first and second transport surfaces are positioned at a level below the blocking surfaces of the left and right deck plates adjacent to the first and second crop conveyors; and
a collector device.

17. The harvester header of claim 16, wherein the stripper device further comprises a first crop guide which extends between the blocking surface of the left deck plate and the first moveable closed transport surface of the first crop conveyor, and a second crop guide which extends between the blocking surface of the right deck plate and the second moveable closed transport surface of the second crop conveyor.

18. The harvester header of claim 17, wherein the first crop guide of the stripper device extends at a first angle relative to the blocking surface of the left deck plate, and the second crop guide of the stripper device extends at a second angle relative to the blocking surface of the right deck plate, wherein the first and second angles are between 20° and 70°.

19. The harvester header of claim 17, wherein the stripper device further comprises at least one shield element arranged between the stalk puller and the first or second crop conveyor, wherein the at least one shield element comprises the first or second crop guide.

20. The harvester header of claim 17, wherein the first crop guide of the stripper device is connected to the blocking surface of the left deck plate of the stripper device, thereby forming a continuous surface, and the second crop guide of the stripper device is connected to the blocking surface of the right deck plate of the stripper device, thereby forming another continuous surface.

* * * * *